United States Patent
Joffe

(10) Patent No.: US 6,647,115 B2
(45) Date of Patent: Nov. 11, 2003

(54) METHOD AND APPARATUS FOR AN IMPROVED ANALOG ECHO CANCELLER

(75) Inventor: Daniel M. Joffe, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 10/139,078

(22) Filed: May 3, 2002

(65) Prior Publication Data

US 2002/0126835 A1 Sep. 12, 2002

Related U.S. Application Data

(63) Continuation of application No. 09/875,538, filed on Jun. 6, 2001, now abandoned, which is a continuation of application No. 09/223,923, filed on Dec. 31, 1998, now abandoned.

(51) Int. Cl.[7] .............................................. H04M 1/00
(52) U.S. Cl. ............................. 379/398; 329/406.01
(58) Field of Search .............................. 379/394, 398, 379/399, 378, 380, 402, 403, 404

(56) References Cited

U.S. PATENT DOCUMENTS

| | | |
|---|---|---|
| 3,883,829 A | 5/1975 | Seidel |
| 4,103,112 A | 7/1978 | Korsky |
| 4,232,293 A | 11/1980 | Harris |
| 4,414,435 A | 11/1983 | Parlor |
| 4,458,112 A | 7/1984 | Svala |
| 4,503,289 A | 3/1985 | Spires |
| 4,734,937 A | 3/1988 | Schmid |
| 4,739,462 A | 4/1988 | Farnsworth et al. |
| 4,922,531 A | 5/1990 | Moisin |
| 5,003,260 A | 3/1991 | Auchterlonie |
| 5,274,704 A | 12/1993 | Jakab |
| 5,515,433 A | 5/1996 | Chen |
| 5,815,867 A | 10/1998 | Keasler et al. |

Primary Examiner—Forester W. Isen
Assistant Examiner—Jefferey Harold
(74) Attorney, Agent, or Firm—Thomas, Kayden, Horstemeyer, & Risley, L.L.P.

(57) ABSTRACT

A method and apparatus for providing an improved telephone hybrid function is provided. The present invention uses a transformer having an galvanically isolated sense winding to improve hybrid performance. Performance improvements include removing the effects of variations in winding resistance, independently adjusting a pick-off voltage, reducing the effects of transformer leakage inductance, providing DC isolation between circuits and increasing the signal to noise ratio at the receiver.

16 Claims, 4 Drawing Sheets

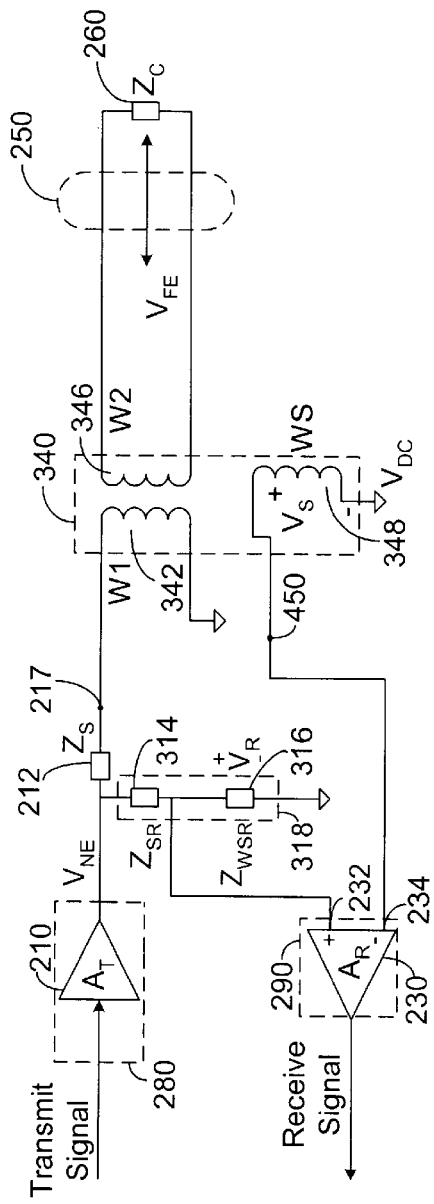
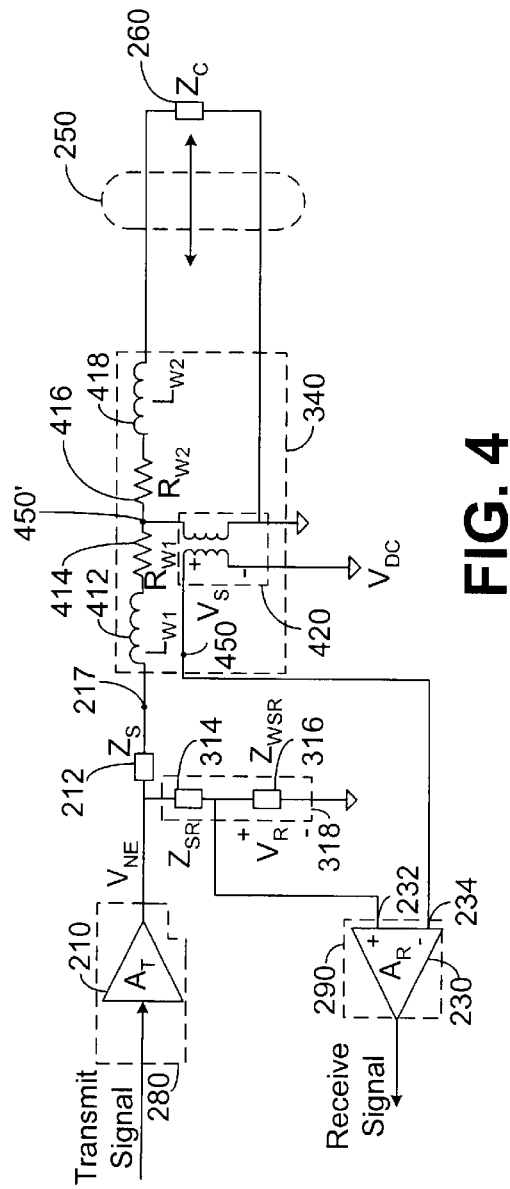
FIG. 3
FIG. 4

METHOD AND APPARATUS FOR AN IMPROVED ANALOG ECHO CANCELLER

This application is a Continuation of prior application Ser. No. 09/875,538 filed Jun. 6, 2001, now ABN incorporated by reference herein, which is a Continuation of prior application Ser. No. 09/223,923 filed Dec. 31, 1998, now ABN incorporated by reference herein.

FIELD OF THE INVENTION

This application relates to telecommunication systems and, more specifically, to a method and apparatus for improving the functionality of a telephone hybrid circuit. The invention provides a means for sensing the communication signal on the bidirectional telephone line pair by incorporating a sense winding in a coupling transformer. Several benefits are provided by the apparatus using the sense winding including an improved signal-to-noise ratio at the receiver output port.

BACKGROUND OF THE INVENTION

A variety of two wire to four wire conversion circuits are used extensively in telecommunication networks. The conversion circuits typically exemplified are hybrid circuits. Hybrid circuits as used herein may also be referred to as analog echo canceller circuits. FIG. 1 is provided to illustrate the functionality of a hybrid circuit.

A hybrid circuit typically has two half-duplex paths, a transmit pair 118 and a receive pair 116, and a full-duplex bidirectional pair 112 of wires. The bidirectional pair may be, for example, a pair of telephone wires coupled from a customer location to a telephone central office (CO) or other facility. The bidirectional pair serves as a transmission channel for a signal from the customer location to a CO and for a signal from the CO to the customer location. Hence at the CO, where a hybrid circuit is used, the bidirectional pair has a receive signal from the customer location and a transmit signal from the CO. The hybrid circuit provides a means for separating the transmit signal and the receive signal at the CO. Persons working in the telecommunication field would appreciate the hybrid circuit can also be used in data communication equipment at a customer location or elsewhere within telecommunication networks.

Referring again to FIG. 1 there is shown a hybrid circuit. The hybrid circuit, as illustrated, is a four port device having a bidirectional port, a receive port, a transmit port, and a balancing impedance port. The bidirectional port is coupled to a bidirectional channel for bidirectional signal flow, i.e., transmit and receive signals flow on the bidirectional channel. The transmit port is the input for a transmit signal which is coupled by a transmit pair of wires. A portion of the transmit signal is coupled to the bidirectional channel for transmission to a far end location. The receive port is coupled to the bidirectional channel and receives a far end signal which is transmitted from the far end location. The receive port therefore contains a receive signal, where the receive signal is typically an attenuated version of the signal from the far end location. The balancing impedance port is coupled to an impedance approximately equal to the impedance of the bidirectional channel.

An ideal hybrid circuit has no energy transferred from the transmit port to the receive port while maximizing energy from the transmitter to the bidirectional port and from the far end through the bidirectional port to the receiver. A figure of merit called the transhybrid loss is used as a measure of the amount of transmit signal contained in the receive signal. It is also important to consider the efficiency with which the transmit signal is transferred to the bidirectional port, and the receive signal is received from the bidirectional port when evaluating the overall performance of a hybrid circuit.

An example of a conventional hybrid circuit is a passive circuit using specially wound transformers, such as described in *Transmission Systems for Communications* by Members of the Technical Staff at Bell Telephone Laboratories, 1981. Conventional hybrid circuit designs include circuits with and without transformers and may use summing amplifiers for signal canceling, as opposed to the canceling magnetic flux arrangements of the hybrid cited in the above reference. Still other conventional circuits, such as the one disclosed by Hirohisa in Japanese Patent Publication 06068346, recognize the need to canceling out the effects of internal resistance variations due to temperature variations of the transformer windings.

SUMMARY OF THE INVENTION

One objective of the present invention is to increase the signal-to-noise ratio (SNR) at the output of a receiver. The receive SNR depends upon the amount of far end (desirable) signal appearing at the receiver, as well as the amount of near end (undesirable) signal appearing at the receiver. An increase in SNR will provide a better bit error ratio and can also allow for an increase in transmission distance. In some data communication systems around a one dB increase in SNR will allow for an additional 500 feet of cable between transceivers, i.e., between the near end and far end locations.

Another objective of the present invention is to remove the DC response ambiguity caused by variations of winding resistance in hybrid circuits using transformers. The variations of winding resistance between various transformers of a given kind and with temperature typically causes the transfer function of the hybrid circuit using a transformer to change at low frequencies. Hence there is a need to avoid the DC response ambiguity caused by temperature and component variations.

In some hybrid circuits having transformers it is desirable that the pick-off signal be at a voltage level independent of either the far end voltage or the near end voltage. The circuit of the present invention, having a separate sense winding on the transformer, provides a means for independently adjusting the level of the pick-off signal by adjusting the number of turns in the sense winding.

Another objective of the present invention is to reduce the effects transformer leakage inductance has on the replica transfer function. A reduction in these effects allows a hybrid circuit having a transformer to operate over a wider range of frequencies, thereby providing better hybrid performance. Further, it renders the hybrid circuit relatively insensitive to changes in leakage inductance with different transformers.

Because analog systems in telecommunications systems may operate with a variety of common-mode voltages and power supply voltages, it is sometimes useful to have DC isolation between circuits. The present invention provides a means for providing DC isolation.

The above objectives indicate there is a need for an improved method and apparatus for providing hybrid coupling. Further the apparatus and method should be cost effective and have parameters that may be changed to meet the needs of individual users. A sense winding on a transformer arranged as a coupling element serves to meet the above objectives.

Thus, in accordance with a preferred embodiment of the present invention, an apparatus is provided for canceling a near end signal from a far end signal in a communication system having a bidirectional transmission medium. The apparatus includes: a transformer first winding for conveying the near end signal to the bidirectional transmission medium; a transformer second winding coupled to the first winding and the transmission medium for outputting the near end signal onto the bidirectional transmission medium; and a transformer sense winding galvanically isolated from both the first and second windings but coupled to the bidirectional transmission medium for receiving the far end signal from the bidirectional transmission medium and generating a sense winding output containing energy corresponding to both the near end signal and the far end signal. The apparatus further includes a replica network for generating a replica of the near end signal, and a receiver for combining the sense winding output and the replica to provide a receiver output signal that has a substantially reduced amount of near end energy.

In another aspect of the present invention, a method of providing hybrid functionality is disclosed for a system in which near end and far end signals are transmitted and received on a bidirectional communications medium. The method includes the steps of: transmitting a near end signal on the bidirectional communications medium; receiving, at a transformer sense winding having an independently selectable number of turns and an independently selectable DC bias voltage, the far end signal from the bidirectional communications medium; providing, from the sense winding to a receiver, a sense winding output signal having energy corresponding to both the near end and far end signals; generating a replica of the near end signal; providing the replica to the receiver; and combining, at the receiver, the sense winding output signal and the replica to generate a receiver output signal that has a substantially reduced amount of transmit energy.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 3 is an analog echo canceller circuit having a transformer with a sense winding in accordance with the present invention;

FIG. 4 is a detailed illustration of an embodiment of the present invention;

DETAILED DESCRIPTION OF THE PREFERRED EMBODIMENT

Figure 1:
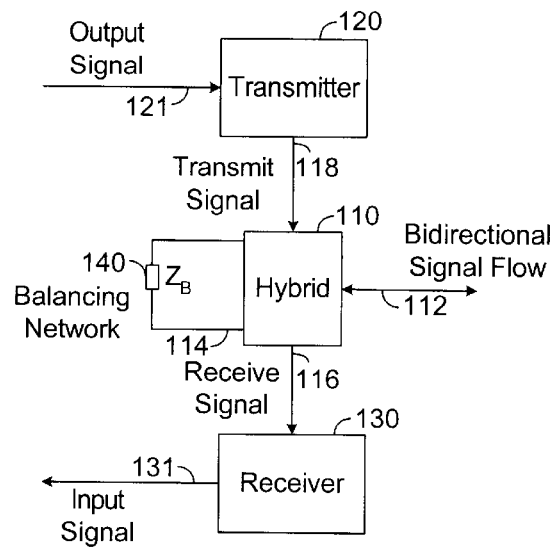
FIG. 1 illustrates a hybrid circuit used for two wire to four wire couplings in telecommunication networks.

An arrangement of elements for a four wire to two wire coupling for telecommunications signals is shown in FIG. 1. The block diagram of FIG. 1 shows a hybrid circuit 110 having a full-duplex bidirectional signal port 112 which is used to transfer information in two directions. A half-duplex transmit port 118 of the hybrid circuit couples a transmit signal from transmitter 120. A far end signal is coupled to a half-duplex receive port 116 and conditioned by a receiver 130. An impedance balancing port 114 of the hybrid couples a balancing network 140 to the hybrid circuit 110 and is typically considered part of the hybrid circuit. The hybrid circuit of FIG. 1 is used in a variety of locations in a telecommunication network, familiar to those skilled in the telecommunications arts.

Figure 2:
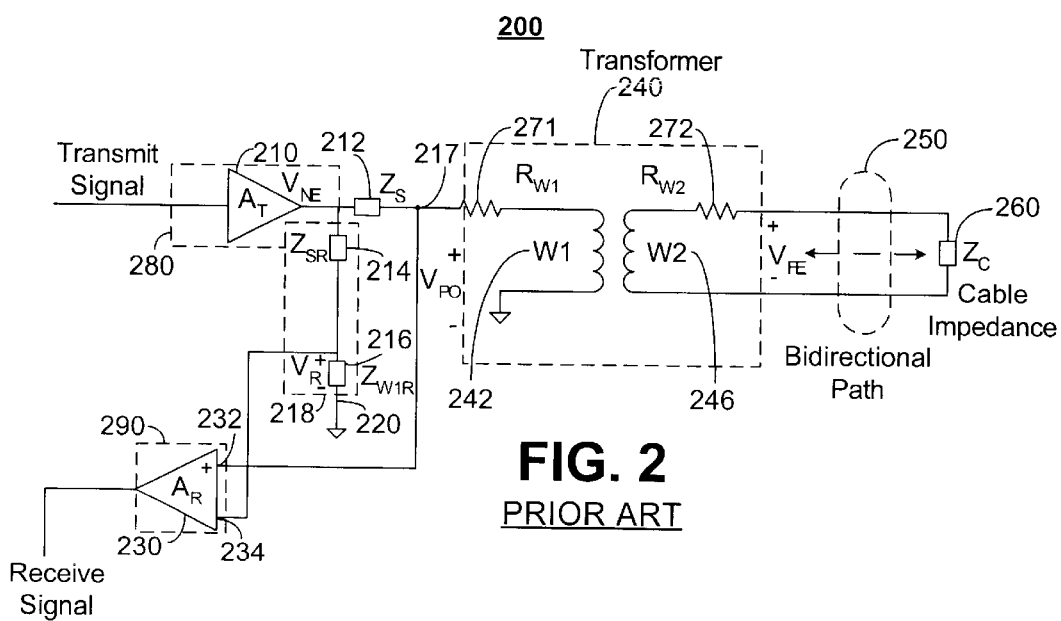
FIG. 2 is a prior art analog echo canceller circuit having a transformer coupling.

A prior art hybrid circuit 200 as shown in FIG. 2 provides the functionality as shown in the block diagram of FIG. 1. As shown in FIG. 2, a transmitter 280 includes a single-ended line driver or transmit amplifier 210 for converting a transmit signal to a near end voltage ($V_{NE}$). The near end voltage ($V_{NE}$) represents a near end signal which can be, for example, a voice signal, a data signal or other telecommunication signal. The near end voltage couples energy through source impedance ($Z_S$) 212 to a transformer 240. The transformer receives the near end energy at a first winding (W1) 242 and couples the energy to a second winding (W2) 246 allowing near end energy to flow in the full-duplex bidirectional path 250.

Signals from the far end are coupled from the full-duplex path 250 through transformer 240 and presented to a receiver 290, which-includes a single-ended receive amplifier 230 having an inverting input 234. A far end voltage ($V_{FE}$) at the second winding 246 of the transformer, represents the far end signal. A pick-off node 217, where the far end signal is picked-off, is the junction of source impedance ($Z_S$) 212 and first winding of the transformer 242. The cable impedance ($Z_C$) 260 is the impedance of the bidirectional channel seen looking towards the source of the far end signal.

As further shown in FIG. 2, the pick-off node 217 has a pick-off voltage ($V_{PO}$). The pick-off voltage ($V_{PO}$) is composed of the desired far-end signal, and the undesired near-end signal, i.e., undesired at the receive signal port. To cancel the near-end component of the pick-off voltage ($V_{PO}$), a replica voltage ($V_R$), for example, can be applied to a signal combining device such as the receive amplifier 230 of FIG. 2. The replica voltage ($V_R$) is generated by a replica network 218. The replica network may be, for example, a series arrangement of a source impedance ($Z_R$) 214 for the replica and a replica impedance ($Z_{WIR}$) 216. Ideally, the replica network transfer function, ($V_R/V_{NE}$) is equal to the pick-off transfer function ($V_{PO}/V_{NE}$). Further, for the ideal case, the near-end signal is completely canceled at the output of receive amplifier 230 and the output serves as the receive signal port.

Note that the presence of a first winding resistance 271 and a second winding resistance 272 in the transformer 240 attenuates the far end signal and increases the near end signal received at the pick-off point. These undesirable effects of winding resistance are reduced by the present invention, as will be seen upon the discussion of FIG. 3.

FIG. 3 shows an embodiment of the present invention. As discussed with respect to FIG. 2, FIG. 3 includes a source impedance ($Z_S$) 212 for coupling the near end voltage ($V_{NE}$) to the bidirectional path 250. Similarly, the far end signal ($V_{FE}$) is coupled to a sense winding 348 in sense transformer 340. The pick-off point ($V_S$) 450, however, is now the output of the sense winding and thus the pick-off point 217 of FIG. 2 has effectively been moved to inside the transformer 340. The sense winding 348, which is galvanically isolated from and magnetically coupled to the first and second windings 342 and 346, is coupled to the inverting terminal 234 which has a relatively high input impedance. The sense winding pick-off point 450 has more far-end signal and less near-end signal than the pick-off point 217 of the prior art circuit of FIG. 2. Further, the sense winding 348 has an independently selectable number of turns ratio for optimizing the signal-to-noise ratio of the received far end signal, and is biased at an independently selectable DC voltage so as to allow for compatibility with various types of receiver circuits.

The replica network 318 in FIG. 3, by way of example and not limitation, is shown as comprising a series arrangement of impedances $Z_{SR}$ 314 and $Z_{WSR}$ 316, wherein $Z_{SR}$ and $Z_{WSR}$ are selected so as to match the transfer functions $V_R/V_{NE}$ and $V_S/V_{NE}$.

FIG. 4 is equivalent to FIG. 3, where the sense transformer 340 is replaced by an equivalent T-model. The T-model clearly shows how the pick-off point has moved from the left side of the transformer to the center of the transformer 450', increasing the far-end signal and decreasing the near-end signal at the pick-off point. For example, the windings of the sense transformer are shown with a 1:1 turns ratio. Sense transformers with a variety of turns ratios fall within the scope of the present invention.

The T-model of FIG. 4 further shows leakage inductances $L_{W1}$ 412 and $L_{W2}$ 418. Once again, the sense winding is used beneficially, this time to mitigate the effect of the leakage inductance. Communications systems are typically configured so that $Z_S$ approximately matches the impedance looking into bidirectional cable 250. Since $L_{W1}$ and $L_{W2}$ are approximately equal in most transformers, their contribution to the transfer function $V_S/V_{NE}$ is minimized because of numerator and denominator canceling effects.

In summary, the circuit of FIG. 4 provides a means for two wire to four wire coupling. The signal from the transmit amplifier 210 is coupled through the sense transformer 340 to the bidirectional path 250. The far end signal is coupled to and through the receive amplifier 230 such that the output of the receive amplifier 230 contains a substantially reduced amount of near end energy along with received far end energy. The novel arrangement of elements in FIG. 4 eliminates DC ambiguity since DC signals cannot be coupled through the transformer. Further, the leakage inductance effects on the replica transfer function are significantly reduced when a sense winding serves as a pick-off point. The voltage signal $V_S$ across the sense winding 348, which represents a pick-off voltage closer to the bidirectional transmission medium and which is a scaled representation of the voltage at node 450', is coupled to the inverting input 234 of the receive amplifier 230. Thus, the voltage signal $V_S$ contains more of the far end signal and less of the near end signal, thereby increasing the SNR at the output of the receive amplifier 230. In addition, since the sense winding may be galvanically isolated from windings W1 and W2, the sense winding can have a different DC voltage or reference voltage from either winding W1 or W2. By contrast, the reference voltage for the receive amplifier in the prior art circuit 200 is always the same as that for the transmit amplifier.

Referring again to FIG. 3, the embodiment of the analog echo canceller circuit shown therein includes a transmitter 280 having a single-ended line driver, i.e., transmit amplifier 210, and a receiver 290 having a single-ended receive amplifier 230. Alternatively, the analog echo canceller of the present invention can be constructed and arranged to include a balanced circuit as shown in the preferred embodiment of FIG. 6. Those skilled in the art would appreciate that the balanced circuit as shown in FIG. 6 typically yields a better signal-to-noise ratio, processes wider signal swings, and rejects distortion and common mode noise better than the single-ended circuit of FIG. 3.

Figure 6:
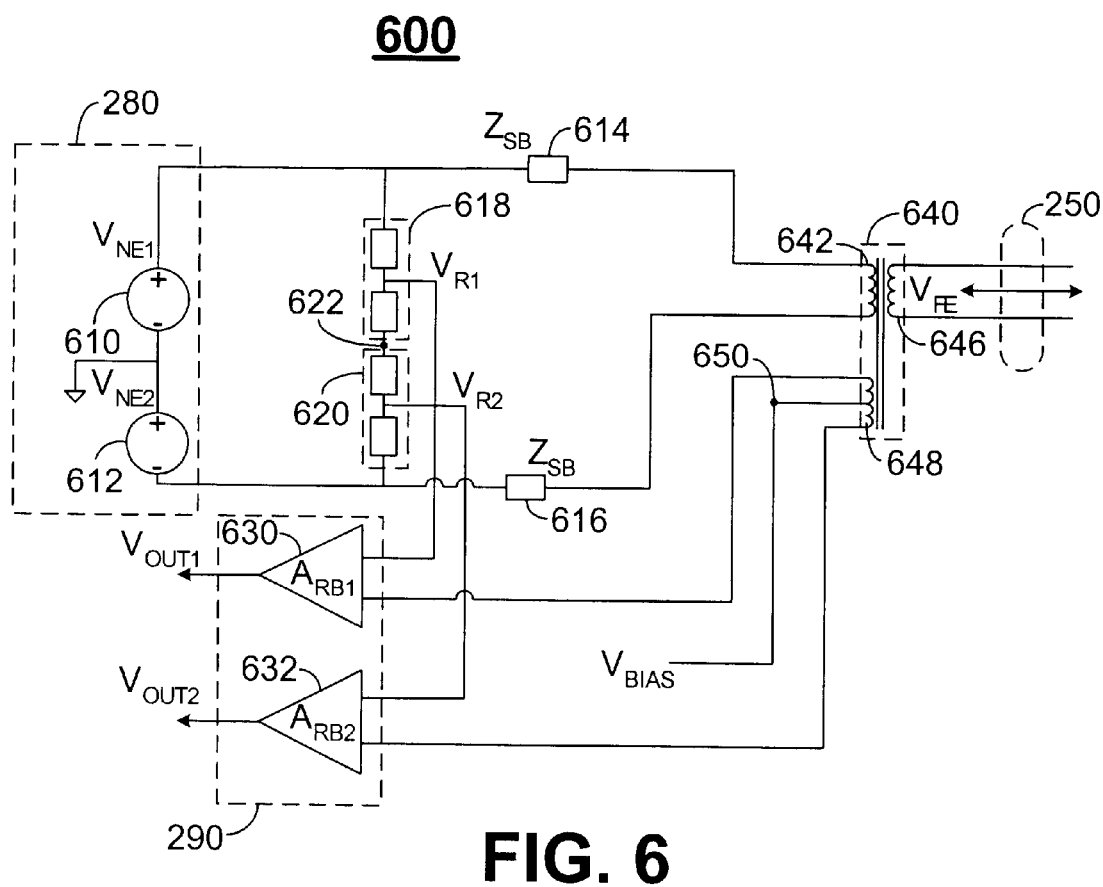
FIG. 6 is an embodiment of the present invention incorporating balanced circuits.

As shown in FIG. 6, the present embodiment of the analog echo canceller includes a balanced circuit in the transmitter having two matched voltage sources 610 and 612. The voltage sources 610 and 612, as shown by example and not limitation, can be coupled across two replica circuits 618 and 620, which are optionally coupled to a bias node 622 as shown in FIG. 6. Each replica circuit 618 and 620 is further coupled to corresponding matching source impedances ($Z_{SB}$) 614 and 616, respectively, which are in turn coupled to a first winding 642 of sense transformer 640. The first winding 642 is in turn coupled to a second winding 646, which itself is coupled to a bidirectional path 250. According to the embodiment of FIG. 6, half the near end signal ($V_{NE1}$) is provided by voltage source 610 and half ($V_{NE2}$) by voltage source 612. Replica signals $VR_1$ and $VR_2$ corresponding to $V_{NE1}$ and $V_{NE2}$, respectively, are generated by replica circuits 618 and 620, respectively.

On the receive side, a far end signal ($V_{FE}$) is applied to a sense winding 648 in the sense transformer 640. The sense winding 648, which may include a center tap 650, is galvanically isolated from both the first and second windings 642 and 646 and is coupled to two receive amplifiers 630 and 632. The center tap 650 of the sense winding 648 may be grounded or biased at an independently selectable DC voltage level $V_{BIAS}$ or left unconnected. As such, the receive amplifiers 630 and 632 each combine the pick-off voltage signal $V_S$, which contains near end energy and far end energy, with replicas from 618 and 620 representing the corresponding near end portions. Each amplifier thus outputs signals $V_{OUT1}$ and $V_{OUT2}$ that have substantially reduced amounts of the corresponding near end signals $V_{NE1}$ and $V_{NE2}$.

As for further details of the circuit of FIG. 6, those skilled in the art would appreciate that values for the components, gain settings, and other design parameters are determined using accepted engineering design practices in conjunction with the teachings of the embodiment of FIG. 3.

Figure 5:
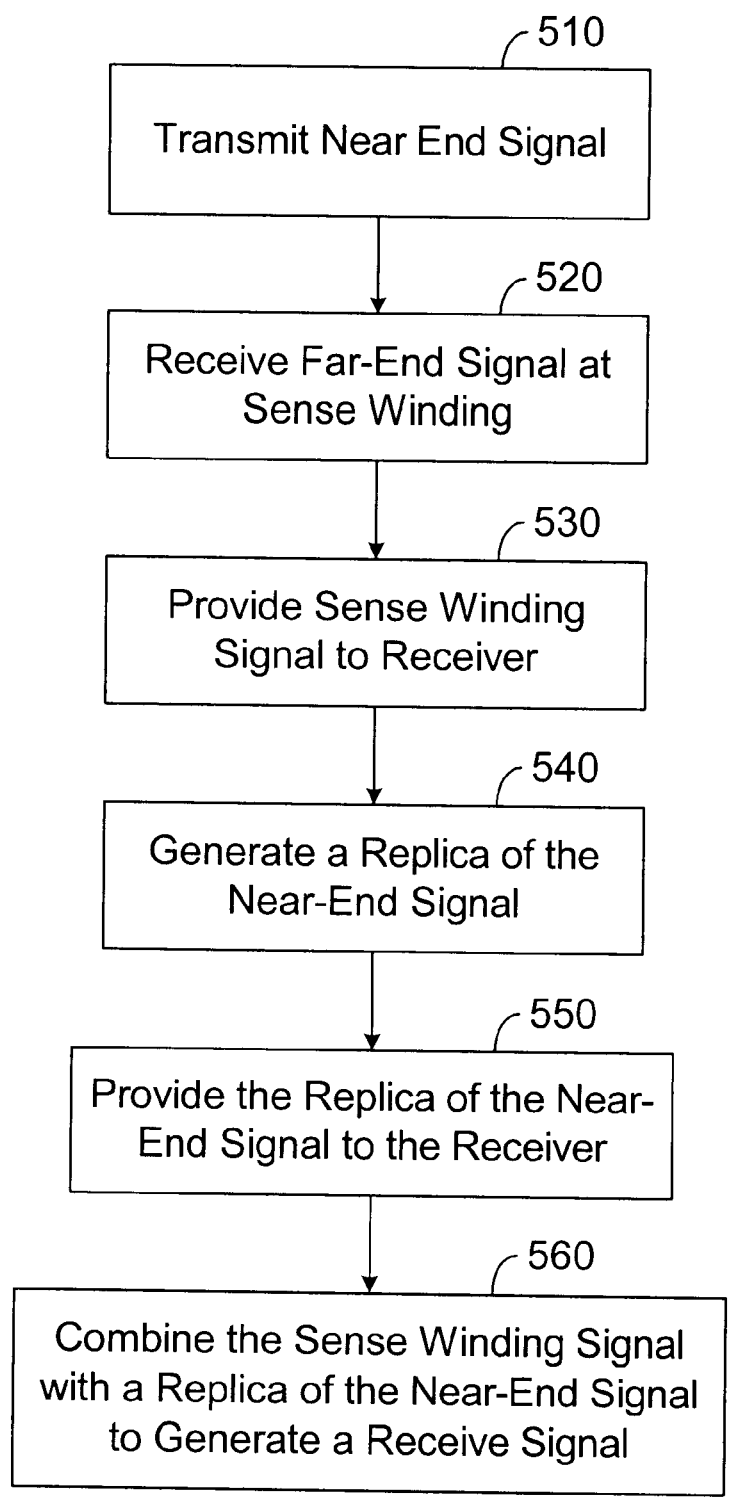
FIG. 5 is a flow chart illustrating the method of the present invention.

A flow chart showing the method of the present invention is provided by FIG. 5. A near end signal is transmitted, step 510, and energy in the near end signal goes to a sense winding and to a replica network for generating a replica. Energy from a far end signal is received at the sense winding, step 520. Both near end energy and far end energy is coupled to the sense winding. The voltage across the sense winding is provided to a receiver, step 530, or more specifically to the inverting input of a receive amplifier. In addition, a replica of the near end signal is generated, step 540, and provided to a non-inverting input of the receive amplifier, step 550. The voltage across the sense winding and replica are combined by the receive amplifier, thereby generating a receive signal containing mostly far end energy, step 560. According to the preferred method of the present invention, the sense winding has an independently selectable number of turns for optimizing the signal-to-noise ratio of the received far end signal, and is biased at an independently selectable DC voltage so as to allow for compatibility with various types of receiver circuits.

If the amount of near end energy in the receive signal is to be kept small, then the transfer function from the output of the transmit amplifier to the input of the receive amplifier must be matched by that of the replica transfer function generating circuit.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. In a communication system having a bidirectional transmission medium, an apparatus for canceling a near end signal from a far end signal, said apparatus comprising:
    a single transformer having (1) a transformer first winding for conveying said near end signal to said bidirectional transmission medium;
    (2) a transformer second winding coupled to said first winding and said transmission medium for outputting said near end signal onto said bidirectional transmission medium; and,
    (3) a transformer sense winding incorporated in said single transformer and galvanically isolated from both said first and second windings but magnetically coupled to said bidirectional transmission medium for receiving said far end signal from said bidirectional transmission medium and generating a sense winding output containing energy corresponding to both said near end signal and said far end signal;
    a replica network for generating a replica of said near end signal; and
    a receiver for combining said sense winding output and said replica to provide a receiver output signal that has a substantially reduced amount of near end energy.

2. The apparatus according to claim 1, wherein said sense winding has an independently selectable number of turns for optimizing this signal-to-noise ratio of said received far end signal.

3. The apparatus according to claim 1, wherein said sense winding is biased at an independently selectable DC voltage level for providing compatibility with various types of receiver circuits.

4. The apparatus according to claim 1, wherein said replica network is a series arrangement of impedances.

5. The apparatus according to claim 1, further comprising a transmitter having a transmit amplifier for providing said near end signal to said first winding.

6. The apparatus according to claim 1, wherein said receiver comprises a receive amplifier for subtracting said replica from said sense winding output.

7. The apparatus according to claim 1, further comprising a transmitter having a balanced circuit for providing said near end signal to said first winding and wherein:
    said replica network comprises two replica circuits for generating replicas; and
    said receiver combines said replicas and said sense winding outputs to provide receiver output signals that have substantially reduced amounts of said near end signal.

8. The apparatus according to claim 1, wherein said sense winding comprises a center tap.

9. The apparatus according to claim 8, wherein said center tap is grounded.

10. The apparatus according to claim 8, wherein said center tap is biased at a DC voltage level.

11. In a communication system having a transmit amplifier and a receive amplifier wherein said transmit amplifier amplifies a near end signal and said receive amplifier amplifies a received far end signal, an echo canceling circuit comprising:
    a single transformer having a sense winding for simultaneously applying said near end signal and said far end signal to a first terminal of said receive amplifier;
    means for generating and coupling a replica of said near end signal to a second terminal of said receive amplifier; and
    means for combining said replica, said near end signal and said far end signal to generate a receive amplifier output that has a substantially reduced amount of near end energy.

12. In a communication system having a balanced circuit in a transmitter for driving a near end signal onto a bidirectional transmission medium and a receiver for receiving a far end signal, an echo canceling circuit comprising:
    a single transformer having a sense winding for simultaneously coupling said near end signal and far end signal to said receiver;
    means for generating and coupling replicas of said near end signal to said receiver; and
    means for combining said replicas, said near end signal and far end signal to generate receive amplifier outputs that have substantially reduced amounts of near end energy.

13. An apparatus for canceling a near end signal from a far end signal, the apparatus comprising:
    a single transformer having a transformer sense winding, said sense winding having an independently selectable pick-off voltage and an independently selectable DC bias voltage, wherein said pick-off voltage represents a signal containing energy from both said near end signal and said far end signal;
    means for generating a replica of said near end signal; and
    means for combining said pick-off voltage and said replica, wherein the output of the combining means is a receive signal that has a substantially reduced amount of near end energy.

14. An apparatus for canceling a near end signal from a far end signal, the apparatus comprising:

a single transformer having a transformer sense winding, said sense winding having an independently selectable pick-off voltages and a center tap having an independently selectable DC bias voltage, wherein said pick-off voltages represent signals containing energy from both near end signal and said far end signal components;

means for generating replicas of said near end signal; and means for combining said pick-off voltages and said replicas, wherein the outputs of the combining means are receive signals that have substantially reduced amounts of near end energy.

15. In a system for transmitting a near end signal and receiving a far end signal on a bidirectional communications medium, a method of providing hybrid functionality comprising the steps of:

transmitting a near end signal on said bidirectional communications medium;

receiving, at a single transformer having a galvanically isolated transformer sense winding, said sense winding having an independently selectable number of turns and an independently selectable DC bias voltage, said far end signal from said bidirectional communications medium;

providing, from said transformer sense winding to a receiver, a sense winding output signal having energy corresponding to both said near end and far end signals;

generating a replica of said near end signal;

providing said replica to said receiver; and combining, at said receiver, said sense winding output signal and said replica to generate a receiver output signal that has a substantially reduced amount of near end energy.

16. In a system having a balanced transmitter for transmitting a near end signal and a receiver for receiving a far end signal on a bidirectional communications medium, a method of providing hybrid functionality comprising the steps of:

transmitting said near end signal on said bidirectional communications medium;

receiving, at a single transformer having a transformer sense winding, said sense winding having an independently selectable number of turns and an independently selectable DC bias voltage, said far end signal from said bidirectional communications medium;

providing, from said sense winding to said receiver, a sense winding output signal having energy corresponding to both said near end and far end signals;

generating replicas of said near end signal;

providing said replicas to said receiver; and combining, at said receiver, said sense winding output signals and said replicas to generate receiver output signals that have substantially reduced amounts of near end energy.

* * * * *